UNITED STATES PATENT OFFICE.

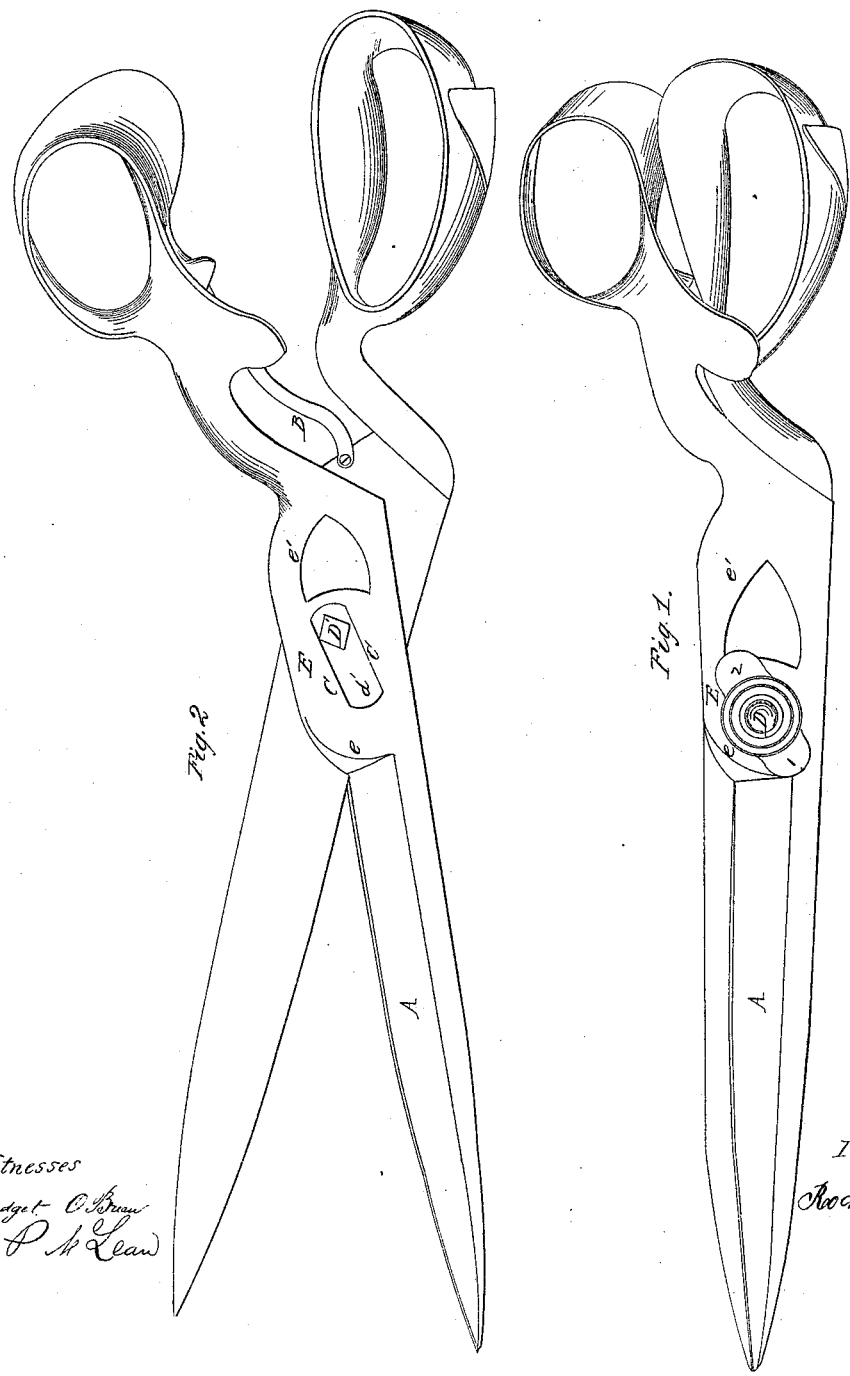

R. HEINISCH, OF NEWARK, NEW JERSEY.

TAILOR'S SHEARS.

Specification forming part of Letters Patent No. 20,879, dated July 13, 1858; Reissued April 26, 1859, No. 704.

*To all whom it may concern:*

Be it known that I, ROCHUS HEINISCH, of Newark city, in the county of Essex, in the State of New Jersey, have made certain novel and useful Improvements in Tailors' Shears; and I hereby declare the following to be a full, clear, and exact description thereof, reference being had to the accompanying drawings and to the letters of reference marked thereon, which letters correspond with and constitute a part of the specification.

In order that the public may fully understand the nature of my invention and those who are skilled in the art be enabled to construct and operate the same I will describe it as follows:

*Description.*—Figure 1, is a side view of my improved tailors' shears when closed showing the fulcrum (D,) having projections (1, 2) to cover the slot (C,) more fully shown at Fig. 2 which represents the shears extended or opened preparatory to cutting cloth or other fabric. Fig. 2, represents the shears extended having the fulcrum or pivot (D) removed in order to show the slot (C,) and the position of the pivot (D,) in the slot (C,) when the shears are opened to the extreme width required to cut heavy cloth.

The nature of my invention consists in constructing tailors' shears with an oblique slot in the shank of the lower blade, running from the rear downward, and in connecting the blades by a lever, which on the separation of cutting edges, shall have the effect of moving the lower blade longitudinally and vertically; so as to give the lower blade a drawing cut without the effect of diminishing the extent of the cutting edges.

When the shears are closed as at Fig. 1, the movable blade (A,) is drawn back by means of lever (B,) and the slot (C,) in the elongated shank or joint (E) until the fulcrum or pivot (D,) stands at the point ($d.'$) Hence as the shears are opened the under blade (A,) is pushed forward the distance from (D',) to ($d'$ Fig. 2,) and when being closed the blade (A,) is drawn back as aforesaid carrying the cloth with it thereby performing the double purpose of feeding as well as cutting the fabric. The extension of the under blade (A) entirely depends on the length of the slot which can only be used in shears having elongated shanks or joints similar to Figs. 1 and 2 letter (E). The inclination of the slot C may be as great as desired, the effect being to throw the blade downward as the jaws separate and thus prevent the vertex of the angle formed by the cutting edges, from being carried forward, and leaving an unavailable cutting portion behind it. In case the slot (C,) and lever (B,) should not be used the lengthening of the joint or shank of the blades is found to be of the utmost importance in cutting heavy fabrics inasmuch as the leverage from the fulcrum (D) to the hand is increased and the weight of the shears being in the proper place (at E) I am enabled to cut with less labor and greater accuracy than by any other form of tailors' shears ever used.

I am well aware of the different kinds of scissors having long handles with short blades used in surgical operations and otherwise and trimmer's shears &c. consequently lengthening the distance from the fulcrum to the hand is not new but constructing tailors' shears so that they are equally balanced by means of lengthening the heel of the blades from ($e$, to $e'$,) in combination with the slot (C,) and lever (B) I believe to be new and useful. Therefore I do not claim elongating the upper blade of a tailors' shears by means of an eccentric pivot neither do I claim a stop set in one blade and working in a curved slot in the other as that is fully shown in Joseph Phares's improvement on tailors' shears patented September 12th 1854, but, what I claim as new and wish to secure by Letters Patent of the United States is—

The oblique rectilinear slot C in the elongated shank of the lower blade A, in combination with the fulcrum D, and the lever B connecting the shanks; the whole constructed and operating substantially as and for the purposes set forth.

In testimony whereof I hereunto subscribe my name in the presence of two witnesses.

ROCHUS HEINISCH.

Witnesses:
 BRIDGET O'BRIEN,
 JAMES P. MCLEAN.

[FIRST PRINTED 1911.]